United States Patent
Katoh et al.

(10) Patent No.: US 12,040,446 B2
(45) Date of Patent: Jul. 16, 2024

(54) SOLID ELECTROLYTE MATERIAL FOR SOLID STATE BATTERIES, SOLID ELECTROLYTE AND SOLID STATE BATTERY

(71) Applicant: TOYOTA MOTOR EUROPE, Brussels (BE)

(72) Inventors: Yuki Katoh, Brussels (BE); Geoffroy Hautier, Brussels (BE); Davide Distefano, Brussels (BE); Yaroslav Filinchuk, Louvain-la-Neuve (BE)

(73) Assignee: TOYOTA MOTOR EUROPE, Brussels (BE)

( * ) Notice: Subject to any disclaimer, the term of this patent is extended or adjusted under 35 U.S.C. 154(b) by 944 days.

(21) Appl. No.: 16/977,492

(22) PCT Filed: Mar. 26, 2018

(86) PCT No.: PCT/EP2018/057672
§ 371 (c)(1),
(2) Date: Sep. 2, 2020

(87) PCT Pub. No.: WO2019/185115
PCT Pub. Date: Oct. 3, 2019

(65) Prior Publication Data
US 2021/0005925 A1 Jan. 7, 2021

(51) Int. Cl.
*H01M 10/0562* (2010.01)
*C01B 25/14* (2006.01)
*H01M 10/0525* (2010.01)

(52) U.S. Cl.
CPC ......... *H01M 10/0562* (2013.01); *C01B 25/14* (2013.01); *H01M 10/0525* (2013.01);
(Continued)

(58) Field of Classification Search
CPC ......... H01M 10/0562; H01M 10/0525; H01M 2300/0068; H01M 10/052; C01B 25/14;
(Continued)

(56) References Cited

U.S. PATENT DOCUMENTS

2018/0097257 A1* 4/2018 Sousa Soares De Oliveira Braga ............... H01G 11/68
2018/0114976 A1* 4/2018 Lee ..................... H01M 4/136
2018/0159172 A1* 6/2018 O'Neill ............... H01M 10/056

FOREIGN PATENT DOCUMENTS

WO WO-2017199821 A1 * 11/2017 ............... H01B 1/06
WO WO-2018021503 A1 * 2/2018 ............... H01B 1/06
(Continued)

OTHER PUBLICATIONS

Di Stefano et al., Superionic diffusion through frustrated energy landscape, Aug. 8, 2017, XP055403366, Retrieved from the Internet: URL:https://arxiv.org/ftp/arxiv/papers/170 8/1708.02997.pdf.
(Continued)

*Primary Examiner* — Kaity V Chandler
(74) *Attorney, Agent, or Firm* — Dickinson Wright, PLLC

(57) ABSTRACT

A solid electrolyte material for a solid state battery (10) having the following chemical formula $XM_2(PS_4)_3$, where P is phosphorus, S is sulfur and X is lithium (Li), sodium (Na), silver (Ag) or magnesium ($Mg_{0.5}$) and M is titanium (Ti), zirconium (Zr), germanium (Ge), silicon (Si), tin (Sn) or a mixture of X and aluminium (X+Al) and exhibiting peaks in positions of $2\theta=13,64°$ ($\pm1°$), $16,48°$ ($\pm1°$) and $22,18°$ ($\pm1°$) in a X-ray diffraction measurement using CuKα line, where $I_A$ is the intensity in arbitrary units of the peak at $13,64°$ ($\pm1°$) and $I_B$ is the intensity in arbitrary units of a peak at $23,34°$ ($\pm1°$), $(I_A-I_B)/(I_A+I_B)>0$.

The disclosure is also related to a solid electrolyte comprising the solid electrolyte material and a solid state battery comprising the solid electrolyte.

7 Claims, 2 Drawing Sheets

(52) U.S. Cl.
CPC ...... *C01P 2002/74* (2013.01); *C01P 2006/40* (2013.01); *H01M 2300/0068* (2013.01)

(58) Field of Classification Search
CPC ..... C01B 33/021; C01B 35/12; C01B 21/086; C01B 25/26; C01B 25/30; C01B 32/198; C01B 32/21; C01B 33/00; C01B 33/06; C01B 35/121; C01P 2002/74; C01P 2006/40; C01P 2002/72; C01P 2002/77; C01P 2004/61; C01P 2004/03; C01P 2006/12; C01P 2002/52; C01P 2004/51; C01P 2004/62; C01P 2002/50; C01P 2002/76; C01P 2004/64; C01P 2002/70; C01P 2004/80; C01P 2006/10; Y02E 60/10; Y02P 70/50
See application file for complete search history.

(56) References Cited

FOREIGN PATENT DOCUMENTS

| | | | |
|---|---|---|---|
| WO | 2018041374 A1 | 3/2018 | |
| WO | WO-2018047566 A1 * | 3/2018 | ............. C01B 25/14 |

OTHER PUBLICATIONS

Shaofei Wang et al., "Identifying Li+ ion transport properties of aluminum doped lithium titanium phosphate solid electrolyte at wide temperature range," Solid State Ionics, 268 (2014) 110-116.

* cited by examiner

SOLID ELECTROLYTE MATERIAL FOR SOLID STATE BATTERIES, SOLID ELECTROLYTE AND SOLID STATE BATTERY

RELATED APPLICATION

This application is a National Stage entry of PCT/EP2018/057672, filed Mar. 26, 2018, the entire disclosure of which is incorporated herein by reference.

TECHNICAL FIELD

The present disclosure is related to solid state batteries, and more particularly to solid state batteries comprising solid electrolyte comprising sulfur having the following formula $XM_2(PS_4)_3$, where X is Li, Na, Ag or $Mg_{0.5}$ and M is Ti, Zr, Ge, Si, Sn or (X+Al).

BACKGROUND

Solid state batteries offer the possibility of having a battery pack with high energy density.

Different materials are studied for solid electrolyte for solid state batteries. Of particular interest are materials comprising sulfur and exhibiting peaks in positions of $2\theta=15.08°$ (±0.50°), 15.28° (±0.50°), 15.92° (±0.50°), 17.5° (±0.50°), 18.24° (±0.50°), 20.30° (±0.50°), 23.44° (±0.50°), 24.48° (±0.50°), and 26.66° (±0.50°) in a X-ray diffraction measurement using CuKα line. These materials generally exhibit good lithium ionic conductivity.

However, increase of the lithium ionic conductivity of such materials is still required for application as solid electrolyte. Indeed, such increase in ionic conductivity of the lithium allows for increase of the electronic conductivity of the solid electrolyte.

SUMMARY

Therefore, according to embodiments of the present disclosure, a solid electrolyte material for a solid state battery is provided. The solid electrolyte material has the following chemical formula $XM_2(PS_4)_3$, where P is phosphorus, S is sulfur and X is lithium (Li), sodium (Na), silver (Ag) or magnesium ($Mg_{0.5}$) and M is titanium (Ti), zirconium (Zr), germanium (Ge), silicon (Si), tin (Sn) or a mixture of X and aluminium (X+Al) and exhibits peaks in positions of $2\theta=13.64°$ (±1°), 16.48° (±1°) and 22.18° (±1°) in a X-ray diffraction measurement using CuKα line, where $I_A$ is the intensity in arbitrary units of the peak at 13.64° (±1°) and $I_B$ is the intensity in arbitrary units of a peak at 23.34° (±1°), $(I_A-I_B)/(I_A+I_B)>0$.

The solid electrolyte material having the above chemical formula and exhibiting the cited peak in a X-ray diffraction measurement using CuKα line have a crystallographic structure allowing for an increase of the X ionic conductivity of such solid electrolyte material.

This increase in ionic conductivity of the X species allows for fast charging of the battery, especially at low temperature, for example at temperature below 0° C. (degree Celsius).

The solid electrolyte material is crystalized in an orthorhombic crystal system (space group Fddd (70)). The crystal structure is made of $PS_4$ tetrahedra and $MS_6$ octahedra. A three dimensional (3D) framework structure is formed by edge sharing of $PS_4$ and $MS_6$ and X species are located at the interstitial site of the 3D framework structure.

According to embodiments, the solid electrolyte material exhibits peaks in positions of $2\theta=13.64°$ (±1°), 13.76° (±1°), 14.72° (±1°), 15.36° (±1°), 15.90° (±1°), 16.48° (±1°), 17.42° (±1°), 17.56° (±1°), 18.58° (±1°), and 22.18° (±1°) in a X-ray diffraction measurement using CuKα line.

According to embodiments, X is lithium.

According to embodiments, M is titanium.

According to embodiments, M is (X+Al).

M being a mixture of X and aluminium, the content of X is increased and the electrochemical stability of the solid electrolyte material is increased thanks to aluminium.

According to embodiments, X is lithium and M is titanium.

According to embodiments, X is lithium and M is a mixture of lithium and aluminium (Li+Al).

According to embodiments, when X is lithium, the diffusion coefficient of lithium in the solid electrolyte material at −20° C. is greater than or equal to $3.0 \cdot 10^{-12}$ m²/s (meter square per second).

The diffusion coefficient is obtained from the Stejskal-Tanner equation:

$$I = I_0 \exp\left(-\gamma^2 g^2 \delta^2 \left(\Delta - \frac{\delta}{3}\right)D\right) \qquad (1)$$

where I is the signal intensity with the gradient, $I_0$ is the signal intensity without the diffusion weighting, γ is the proton gyromagnetic ratio, g is the strength of the gradient pulse, δ is the duration of the pulse, Δ is the time between the leading edges of two gradient pulses and D is the diffusion coefficient.

The diffusion coefficient of lithium in the solid electrolyte material is measured by $^7$Li pulse field gradient (PFG) nuclear magnetic resonance (NMR). The measurement is performed at 155.6 MHz using Avance III HD spectrometer (Bruker Biospin) with a Diff60 diffusion probe. The diffusion coefficient D is measured with Δ varying from 6 ms (millisecond) to 500 ms in a temperature range between 253.15 K (Kelvin) (−20° C.) and 353.15 K (80° C.) by varying the gradient strength g from 0 to 25 Tm$^{-1}$ (Tesla per meter) and the duration δ of the pulse field gradient g from 1 ms to 2.5 ms.

The present disclosure also provides a solid electrolyte comprising such a solid electrolyte material.

The present disclosure also provides a solid state battery comprising such a solid electrolyte.

The present disclosure also provides a method for producing a solid electrolyte material for a solid state battery, the solid electrolyte material having the following chemical formula $XM_2(PS_4)_3$, where P is phosphorus, S is sulfur and X is lithium (Li), sodium (Na), silver (Ag) or magnesium ($Mg_{0.5}$) and M is titanium (Ti), zirconium (Zr), germanium (Ge), silicon (Si), tin (Sn) or a mixture of X and aluminium (X+Al) and the method comprising:
 mixing powders so as to obtain a powder mixture;
 sintering the powder mixture for a period of time equal to or greater than 75 hours and equal to or smaller than 500 hours at a sintering plateau temperature so as to obtain the solid electrolyte material;
wherein the solid electrolyte material exhibits the peaks in positions of $2\theta=$) 13.64° (±1°), 16.48° (±1° and 22.18° (±1°) in a X-ray diffraction measurement using CuKα line, where $I_A$ is the intensity in arbitrary units of the peak at 13.64° (±1°) and $I_B$ is the intensity in arbitrary units of a peak at 23.34° (±1°), $(I_A-I_B)/(I_A+I_B)>0$.

According to embodiments, the solid electrolyte material exhibits peaks in positions of 2θ=13.64° (±1°), 13.76° (±1°), 14.72° (±1°), 15.36° (±1°), 15.90° (±1°), 16.48° (±1°), 17.42° (±1°), 17.56° (±1°), 18.58° (±1°), and 22.18° (±1°) in a X-ray diffraction measurement using CuKα line.

According to embodiments, the component is placed in a container and sealed under Argon at a pressure equal to or smaller than 100 Pa, preferably equal to or smaller than 50 Pa.

According to embodiments, the method comprises a step of amorphasizing the powder mixture so as to obtain an amorphasized powder mixture.

According to embodiments, sintering comprises a sintering plateau temperature equal to or smaller than 500° C., preferably equal to or smaller than 400° C.

The powder mixture being amorphasized, the powder mixture is more reactive and sintering of the powder mixture may be obtained at temperature equal to or smaller than 500° C.

According to embodiments, the sintering plateau time is equal to or greater than 100 hours, preferably equal to or greater than 150 hours and equal to or smaller than 400 hours, preferably equal to or smaller than 300 hours.

According to embodiments, the powder mixture is pressed to form a component at a pressure equal to or greater than 25 MPa, preferably equal to or greater than 50 MPa, more preferably equal to or greater than 75 MPa, and equal to or smaller than 500 MPa, preferably equal to or smaller than 400 MPa, more preferably equal to or smaller than 300 MPa.

According to embodiments, X is lithium.

According to embodiments, M is titanium.

According to embodiments, M is (X+Al).

M being a mixture of X and aluminium, the content of X is increased and the electrochemical stability of the solid electrolyte material is increased thanks to aluminium.

According to embodiments, X is lithium and M is titanium.

According to embodiments, X is lithium and M is a mixture of lithium and aluminium (Li+Al).

According to embodiments, when X is lithium, the diffusion coefficient of lithium in the solid electrolyte material at −20° C. is greater than or equal to $3.0 \cdot 10^{-12}$ m²/s (meter square per second).

The present disclosure also provides a method for producing a solid electrolyte for a solid state battery, the method comprising the steps of producing a solid electrolyte material as defined above.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles thereof.

DETAILED DESCRIPTION

Reference will now be made in detail to exemplary embodiments of the disclosure, examples of which are illustrated in the accompanying drawings. Wherever possible, the same reference numbers will be used throughout the drawings to refer to the same or like parts.

Figure 1:
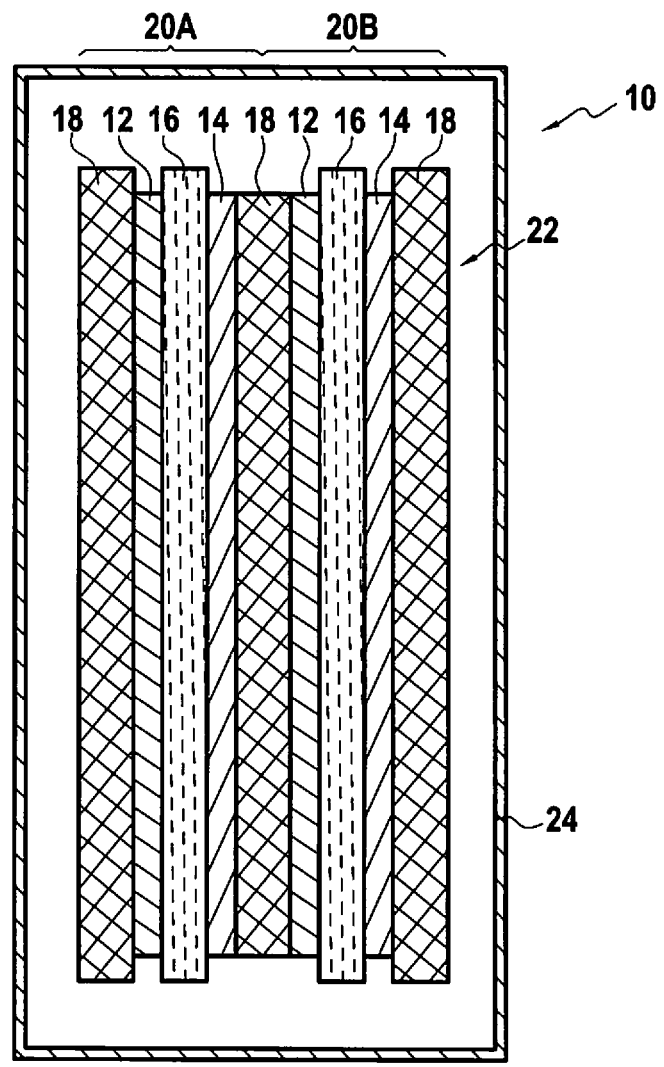
FIG. 1 shows a schematic cross-sectional view of an exemplary solid state battery according to embodiments of the present disclosure.

FIG. 1 shows a schematic cross-sectional view of an exemplary solid state battery 10 according to embodiments of the present disclosure. In FIG. 1, the solid state battery 10 comprises a first cell 20A and a second cell 20B, adjacent to the first cell 20A. The first cell 20A and the second cell 20B form a stack of cells 22. Each cell 20A, 20B comprises a positive electrode 12 and a negative electrode 14. The cell 10 also comprises a solid electrolyte 16 disposed between the positive electrode 12 and the negative electrode 14, the positive electrode 12, the solid electrolyte 16 and the negative electrode 14 being disposed between two current collectors 18. The solid electrolyte 16 is as previously defined.

The current collectors 18 may be made of stainless steel, gold (Au), platinum (Pt), nickel (Ni), aluminum (Al) or copper (Cu) or alloys comprising these materials. This list is not limitative. The two current collectors 18 may be made of the same material or the two current collectors may be made of different materials. For example, the current collector on the positive electrode side may be made of Al and the current collector on the negative electrode side may be made of Cu.

The solid state battery 10 comprises a container 24 enclosing the stack of cells 22. In FIG. 1, the stack of cells 22 comprises a first cell 20A and a second cell 20B, the two adjacent cells 10 share a current collector 18. The stack of cells 22 may comprise more cells 10. The elements of the solid state battery 10 that are not requested for the comprehension of the present disclosure have been omitted and will not be describe in this disclosure.

The solid state battery 10 of FIG. 1 is schematic. It is understood that an solid state battery 10 may comprise a large number of adjacent cells 20A, 20B.

Figure 2:
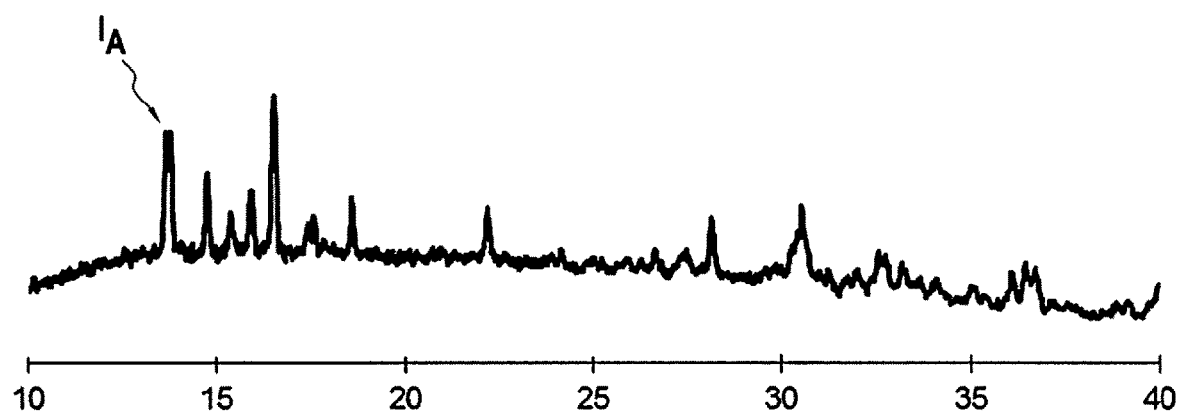
FIG. 2 shows a X-ray diffraction spectrum of a solid electrolyte material according to embodiments of the present disclosure.

FIG. 2 shows a X-ray diffraction spectrum of Sample 1, which is a solid electrolyte material according to embodiments of the present disclosure. The intensity of the peak is in arbitrary units and is given as a function of 2θ values expressed in degrees.

As may be seen on FIG. 2, Sample 1 exhibits the peaks in positions of 2θ=13.64° (±1°), 13.76° (±1°), 14.72° (±1°), 15.36° (±1°), 15.90° (±1°), 16.48° (±1°), 17.42° (±1°), 17.56° (±1°), 18.58° (±1°), and 22.18° (±1°) in a X-ray diffraction measurement using CuKα line.

Figure 3:
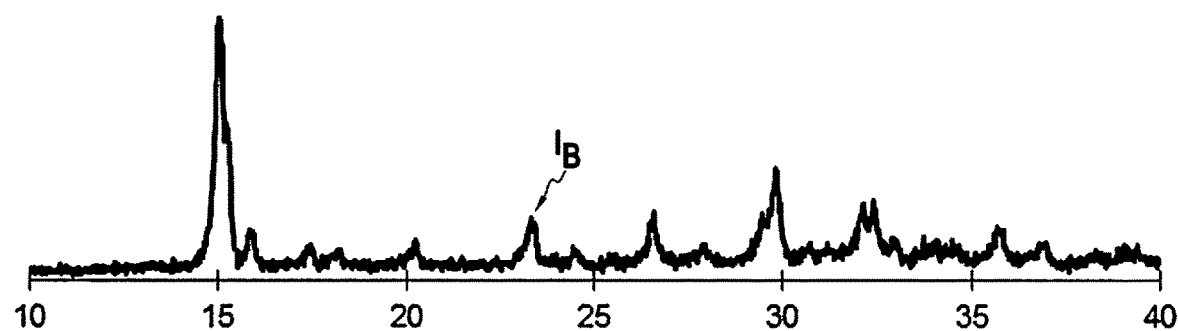
FIG. 3 shows a X-ray diffraction spectrum of a comparative sample.

FIG. 3 shows a X-ray diffraction spectrum of Sample 2 which is a comparative sample.

Sample 1 and Sample 2 are both $LiTi_2(PS_4)_3$ solid electrolyte material.

$I_A$ is the intensity in arbitrary units of the peak at 13.64° (±1°) (see FIG. 1) and $I_B$ is the intensity in arbitrary units of a peak at 23.34° (±1°) (see FIG. 2).

As shown on FIG. 2, $(I_A-I_B)/(I_A+I_B)=1$ for Sample 1.

As shown on FIG. 3, $(I_A-I_B)/(I_A+I_B)=-1$ for Sample 2.

The diffusion coefficient of lithium in the solid electrolyte material was measured for Sample 1 and Sample 2 at −20° C.

The diffusion coefficient is obtained from the Stejskal-Tanner equation:

$$I = I_0 \exp\left(-\gamma^2 g^2 \delta^2 \left(\Delta - \frac{\delta}{3}\right) D\right) \quad (1)$$

where I is the signal intensity with the gradient, $I_0$ is the signal intensity without the diffusion weighting, $\gamma$ is the proton gyromagnetic ratio, g is the strength of the gradient pulse, $\delta$ is the duration of the pulse, $\rightarrow$ is the time between the leading edges of two gradient pulses and D is the diffusion coefficient.

The diffusion coefficient of lithium in the solid electrolyte material is measured by $^7$Li pulse field gradient (PFG) nuclear magnetic resonance (NMR). The measurement is performed at 155.6 MHz using Avance III HD spectrometer (Bruker Biospin) with a Diff60 diffusion probe. The diffusion coefficient D is measured with $\Delta$ varying from 6 ms (millisecond) to 500 ms in a temperature range between 253.15 K (Kelvin) (−20° C.) and 353.15 K (80° C.) by varying the gradient strength g from 0 to 25 $Tm^{-1}$ (Tesla per meter) and the duration $\delta$ of the pulse field gradient g from 1 ms to 2.5 ms.

The diffusion coefficient D of lithium in the solid electrolyte material is equal to $3.2 \cdot 10^{-12}$ m$^2$/s for Sample 1 and to $2.8 \cdot 10^{-12}$ m$^2$/s for Sample 2.

Figure 4:
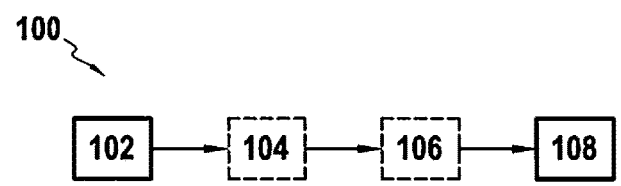
FIG. 4 shows a flow chart of a method for producing a solid electrolyte material according to embodiments of the present disclosure.

A method 100 for producing a solid electrolyte material and/or solid electrolyte 16 according to embodiments of the present disclosure will be described in reference to FIG. 4, taking Sample 1.

In step 102, 0.0396 g (gram) of $Li_2S$, 0.5745 g of $P_2S_5$ and 0.3859 g of $TiS_2$ are mixed together so as to obtain a powder mixture. $Li_2S$ (99%, lithium sulphide, Sigma-Aldrich®), $P_2S_5$ (98%, phosphorous pentasulfide, Sigma-Aldrich®) and $TiS_2$ (99.9%, titanium disulphide, Sigma-Aldrich®) are powders having a degree of purity equal to or greater than 99 mass %.

In step 104, which is not a mandatory step, the powder mixture is amorphasized in a planetary milling equipment (Fritsch, P7). The powder mixture was disposed in a zirconium pot of 45 mL (millilitre) content with 18 zirconium balls having a diameter of 10 mm (millimetre) under Argon. The powder mixture was amorphasized for 40 hours at 370 rpm (round per minute) so as to obtain amorphasized powder mixture.

In step 106, which is not a mandatory step, the amorphasized powder mixture is pressed at a pressure equal to or greater than 25 MPa, preferably equal to or greater than 50 MPa, more preferably equal to or greater than 75 MPa, and equal to or smaller than 500 MPa, preferably equal to or smaller than 400 MPa, more preferably equal to or smaller than 300 MPa.

For example 100 mg of the amorphasized powder mixture is pressed at 200 MPa so as to form a pressed amorphasized powder mixture.

In step 108, the pressed amorphasized powder mixture is sintered in a closed glass tube.

For example, the 100 mg pressed amorphasized powder mixture is put into a glass tube and the glass tube is sealed under Argon under very low pressure, for example 30 Pa. The component is sintered at a sintering plateau temperature of 400° C. (degree Celsius) for a sintering plateau time of 300 hours so as to obtain the solid electrolyte material and/or solid electrolyte 16 of Sample 1.

The method may further include a step of shaping the powder mixture into a desired shape of the solid electrolyte 16. For example, the shaping step may be included in step 106. Shaping of powder into a component such as the solid electrolyte 16 is known.

The method for producing Sample 2 is similar to the method for producing Sample 1, except that, in step 108, the sintering plateau time of the pressed amorphasized powder mixture was 8 hours.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A solid electrolyte material for a solid state battery having the following chemical formula $XM_2(PS_4)_3$, where P is phosphorus, S is sulfur and X is lithium (Li), sodium (Na), silver (Ag) or magnesium ($Mg_{0,5}$) and M is a mixture of X and aluminium (X+Al) and exhibiting peaks in positions of 2θ=13,64° (±1°), 16,48° (±1° and 22,18° (±1° in a X-ray diffraction measurement using CuKα line, where $I_A$ is the intensity in arbitrary units of the peak at 13,64° (±1° and TB is the intensity in arbitrary units of a peak at 23,34° (±1°, $(I_A-I_B)/(I_A+I_B)>0$.

2. The solid electrolyte material according to claim 1, exhibiting peaks in position of 2θ=13,64° (±1°), 13,76° (±1°), 14,72° (±1°), 15,36° (±1°), 15,90° (±1°), 16,48° (±1°), 17,42° (±1°), 17,56° (±1°), 18,58° (±1°, and 22,18° (±1° in a X-ray diffraction measurement using CuKα line.

3. The solid electrolyte material according to claim 1, wherein X is lithium.

4. The solid electrolyte material according to claim 3, wherein M is a mixture of lithium and aluminium (Li+Al).

5. The solid electrolyte material according to claim 3, wherein the diffusion coefficient of lithium in the solid electrolyte at −20° C. is greater than or equal to $3,0.10^{-12}$ m$^2$/s.

6. A solid electrolyte comprising a solid electrolyte material according to claim 1.

7. A solid state battery comprising a solid electrolyte according to claim 6.

* * * * *